United States Patent
Kim et al.

(10) Patent No.: US 10,457,029 B2
(45) Date of Patent: Oct. 29, 2019

(54) APPARATUS AND METHOD FOR MANUFACTURING DISPLAY APPARATUS

(71) Applicant: Samsung Display Co., Ltd., Yongin-si, Gyeonggi-do (KR)

(72) Inventors: Byeonghyun Kim, Yongin-si (KR); Myungsoo Kyung, Yongin-si (KR); Seungjoo Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/693,224

(22) Filed: Aug. 31, 2017

(65) Prior Publication Data

US 2018/0065352 A1  Mar. 8, 2018

(30) Foreign Application Priority Data

Sep. 2, 2016 (KR) .................. 10-2016-0113278

(51) Int. Cl.
*B32B 37/10* (2006.01)
*B32B 37/00* (2006.01)
(Continued)

(52) U.S. Cl.
CPC ............ *B32B 37/10* (2013.01); *B32B 37/025* (2013.01); *B32B 37/1027* (2013.01);
(Continued)

(58) Field of Classification Search
CPC ... B32B 2457/20; B32B 37/025; B32B 37/10; B32B 37/12; G03D 15/00; G03D 15/06; B65B 13/24
See application file for complete search history.

(56) References Cited

FOREIGN PATENT DOCUMENTS

KR  10-2006-0001561 A  1/2006
KR  10-2006-0073043 A  6/2006
(Continued)

OTHER PUBLICATIONS

English translation of KR10-2006-0001561.*
(Continued)

*Primary Examiner* — Sonya M Sengupta
(74) *Attorney, Agent, or Firm* — Lewis Roca Rothgerber Christie LLP

(57) ABSTRACT

An apparatus and method of manufacturing a display apparatus are provided. The apparatus for manufacturing a display apparatus includes a support; a first stage arranged on the support, the first stage being configured to move linearly and to receive a film member thereon, a second stage spaced apart from the first stage, and arranged on the support, the second stage being configured to move linearly and to receive a display panel thereon. an adhesive belt spaced from the support, the adhesive belt being configured to selectively adhere to the film member, a tension maintenance portion arranged on the support, the tension maintenance portion being configured to ascend and descend and to maintain a tension of the adhesive belt, and a pressing portion under the tension maintenance portion, the pressing portion being configured to move linearly and to press the adhesive belt toward one of the first stage and the second stage.

13 Claims, 10 Drawing Sheets

(51) Int. Cl.
 B32B 37/12 (2006.01)
 B65B 13/24 (2006.01)
 G03D 15/00 (2006.01)
 G03D 15/06 (2006.01)
(52) U.S. Cl.
 CPC .......... *B32B 37/12* (2013.01); *B32B 2457/20* (2013.01); *B65B 13/24* (2013.01); *G03D 15/00* (2013.01); *G03D 15/06* (2013.01)

(56) References Cited

FOREIGN PATENT DOCUMENTS

KR 10-1328742 B1 11/2013
KR 10-1376625 B1 4/2014

OTHER PUBLICATIONS

English translation of KR 10-2006-0073043.*
English translation of KR 10-1328742.*
English translation of KR 10-1376625.*
English translation of KR-101376625-B1.*

* cited by examiner

APPARATUS AND METHOD FOR MANUFACTURING DISPLAY APPARATUS

CROSS-REFERENCE TO RELATED APPLICATION

This application claims priority to, and the benefit of, Korean Patent Application No. 10-2016-0113278, filed on Sep. 2, 2016, in the Korean Intellectual Property Office, the disclosure of which is incorporated herein in its entirety by reference.

BACKGROUND

1. Field

One or more embodiments relate to an apparatus and method for manufacturing a display apparatus.

2. Description of the Related Art

Electronic devices based on mobility have been widely used. Recently, tablet personal computers (PCs), in addition to small-sized electronic devices, such as mobile phones, have been widely used as mobile electronic devices.

Such mobile electronic devices include a display apparatus in order to support various functions, or to provide a user with visual information such as images and videos. Recently, components for driving a display apparatus have been miniaturized (or made smaller), and accordingly, the importance of the display apparatus in electronic devices has been increasing. In addition, mobile electronic devices having a structure that may be bent from a flat state to a state having an angle has also been developed.

SUMMARY

In general, a display panel may be subject to damage by an external force, etc. or visibility thereof may be degraded in strong light, and thus, various films may be attached onto the display panel to solve these problems. For example, when a film is rapidly and accurately attached onto the display panel, a defect rate of a display apparatus may be decreased (or reduced), while rapidly manufacturing the display apparatus. Accordingly, one or more embodiments include an apparatus and method of manufacturing a display apparatus, whereby, in the manufacture of the display apparatus, a defect rate is decreased (or reduced), and an operation speed of manufacturing is increased.

Additional aspects are set forth in part in the description which follows and, in part, will be apparent from the description, or may be learned by practice of the presented embodiments.

According to one or more embodiments, an apparatus for manufacturing a display apparatus includes a support; a first stage arranged on the support, the first stage being configured to move linearly and to receive a film member thereon; a second stage spaced apart from the first stage, and arranged on the support, the second stage being configured to move linearly and to receive a display panel thereon; an adhesive belt spaced from the support, the adhesive belt being configured to selectively adhere to the film member; a tension maintenance portion arranged on the support, the tension maintenance portion being configured to ascend and descend and to maintain a tension of the adhesive belt; and a pressing portion under the tension maintenance portion, the pressing portion being configured to move linearly and to press the adhesive belt toward one of the first stage and the second stage.

In some embodiments, the support may include a first support, wherein the first stage and the second stage may be configured to move linearly along the first support; and a second support connected to the first support, wherein the tension maintenance portion may be configured to move linearly along the second support.

In some embodiments, the apparatus may further include a first linear driver between the first stage and the support, wherein the first linear driver may allow the first stage to reciprocate in a first direction.

In some embodiments, the apparatus may further include a second linear driver between the second stage and the support, wherein the second linear driver may allow the second stage to reciprocate in a first direction.

In some embodiments, the first stage may include a first table for receiving the film member; and a first table alignment driver configured to rotate the first table or to move the first table in a second direction.

In some embodiments, the second stage may include a second table for receiving the display panel; and a second table alignment driver configured to rotate the second table or to move the second table in a second direction different from a first direction.

In some embodiments, the adhesive belt may include a belt body fixed to the tension maintenance portion; and an adhesive sheet arranged on the belt body.

In some embodiments, the tension maintenance portion may include an ascent-descent portion mounted on the support to ascend and descend; and a movement portion connected to the ascent-descent portion and configured to move in a direction different from the third direction.

In some embodiments, the tension maintenance portion may further include a tension portion arranged on the ascent-descent portion and configured to maintain tension of the adhesive belt.

In some embodiments, the pressing portion may include a first length-variable portion arranged at the movement portion and having a variable length; and a pressure roller connected to the first length-variable portion and contacting the adhesive belt.

In some embodiments, the pressing portion may further include a bending roller connected to the first length-variable portion and configured to bend the adhesive belt.

In some embodiments, the bending roller and the pressure roller may contact different surfaces of the adhesive belt.

In some embodiments, the pressing portion may further include a contacting portion connected to the pressure roller and configured to separate the film member from the adhesive belt when the film member and the adhesive belt are attached to each other.

According to one or more embodiments, a method of manufacturing a display apparatus includes arranging a film member on a first stage; arranging a display panel on a second stage; linearly moving the first stage so that the film member is aligned with an adhesive belt; linearly moving a pressing portion to attach the film member to the adhesive belt; linearly moving the second stage so that the display panel is aligned with the film member; and pressing the adhesive belt toward the display panel via the pressing portion to separate the film member from the adhesive belt, and to attach the film member to the display panel.

In some embodiments, the film member may gradually adhere to the display panel in a direction from a first end of the display panel to a second end of the display panel opposite to the first end.

In some embodiments, the pressing the adhesive belt toward the display panel may include bending the adhesive belt may be bent belt at an initial area of attachment of the film member and the display panel.

In some embodiments, the pressing the adhesive belt toward the display panel may include moving the pressing portion in a first direction to attach the film member to the adhesive belt; and moving the pressing portion in a second direction opposition to the first direction to attach the film member to the display panel.

In some embodiments, the method may further include applying a tensile force to the adhesive belt.

In some embodiments, the pressing portion may bend the adhesive belt in more than one direction, each of the directions being different from each other.

In some embodiments, the film member may be separated from the adhesive belt by a contacting portion.

Embodiments of the present invention may be implemented by using a system, a method, a computer program, or a combination thereof.

BRIEF DESCRIPTION OF THE DRAWINGS

These and/or other aspects will become apparent and more readily appreciated from the following description of embodiments of the present invention, taken in conjunction with the accompanying drawings in which.

DETAILED DESCRIPTION

Figure 1:
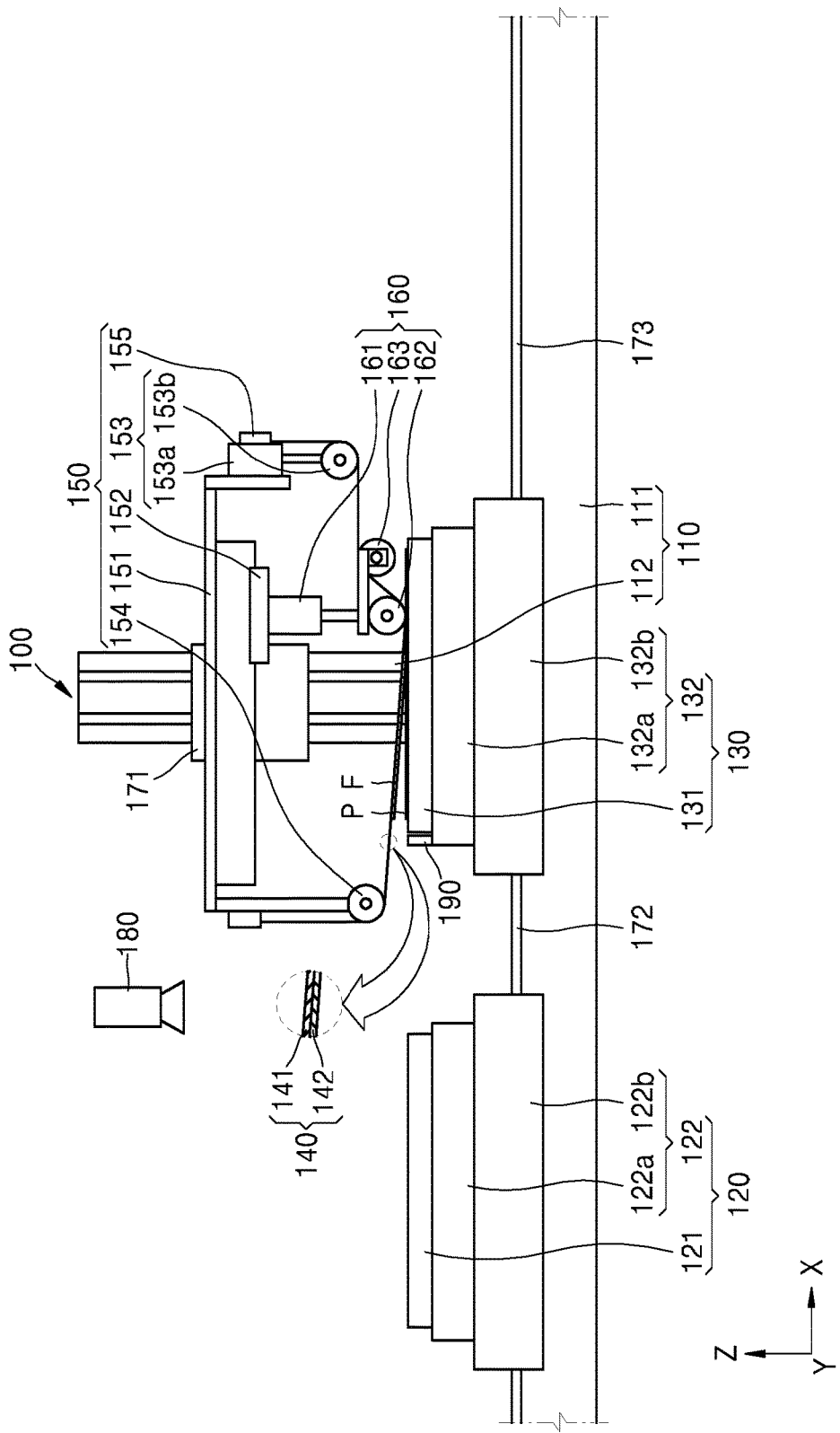
FIG. 1 is a front view of an apparatus for manufacturing a display apparatus according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. In the drawings, the relative sizes of elements, layers, and regions may be exaggerated for clarity. As used herein, the term "and/or" includes any and all combinations of one or more of the associated listed items. Expressions such as "at least one of," when preceding a list of elements, modify the entire list of elements and do not modify the individual elements of the list.

It will be understood that although the terms "first," "second," etc. may be used herein to describe various components, these components should not be limited by these terms. These components are only used to distinguish one component from another. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

As used herein, the singular forms "a," "an," and "the" are intended to include the plural forms as well, unless the context clearly indicates otherwise.

It will be further understood that the terms "includes," "including," "comprises," and/or "comprising" used herein specify the presence of stated features or components, but do not preclude the presence or addition of one or more other features or components.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

As used herein, the terms "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." In addition, the use of alternative language, such as "or," when describing embodiments of the present invention, refers to "one or more embodiments of the present invention" for each corresponding item listed. As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

In the following examples, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

When a certain embodiment may be implemented differently, a specific process order may be performed differently from the described order. For example, two consecutively described processes may be performed substantially at the same time or performed in an order opposite to the described order.

FIG. 1 is a front view of an apparatus 100 for manufacturing a display apparatus, according to an embodiment.

Referring to FIG. 1, the apparatus 100 may include a support 110, a first stage 120, a second stage 130, an adhesive belt 140, a tension maintenance portion 150, a pressing portion 160, a first linear driver 172, a second linear driver 173, and a vision portion 180.

The support 110 may be installed on an external structure or on the ground. The support 110 may include a first support 111 and a second support 112 connected to the first support 111 at an angle (e.g., at a certain angle or a predetermined angle).

For example, the first support 111 may be arranged horizontally with respect to the ground (e.g., the first support 111 may be arranged to be parallel to, or substantially parallel to, the ground), and the second support 112 may be arranged vertically with respect to the ground (e.g., the second support 112 may be arranged to be normal to, perpendicular to, or substantially perpendicular to, the ground).

The first stage 120 may be arranged on the first support 111. As such, the first stage 120 may reciprocate (or linearly move) in (or along) a length direction of the first support 111 (e.g., along the X-axis in FIG. 1).

The first stage 120 may include a first table 121 and a first table alignment driver 122. The first table 121 may have a film member F positioned thereon, and the film member F may be fixed to the first table 121. A method of fixing the film member F to the first table 121 may vary. For example, the first table 121 may include an electrostatic chuck or an adhesive chuck. In another embodiment, a suction hole (or a suction opening) may be formed in the first table 121, and a suction pump may be provided at the suction opening to fix the film member F by vacuum. For convenience of description, reference is made herein to an embodiment in which the first table 121 has the film member F fixed thereto by vacuum via a suction opening.

The film member F may have various suitable forms. For example, the film member F may include at least one of a polarizing film, a touchscreen panel, and a functional film. For example, the film member F may be a functional film having a function (e.g., a certain function or a predetermined function), such as a scratch-resistant film member, a corrosion-resistant film member, a reinforcing film member, etc. However, for convenience of description, reference is made herein to an embodiment in which the film member F includes a polarizing film.

The first table alignment driver 122 may include a first table rotation driver 122a and a first aligning driver 122b.

The first table rotation driver 122a may be connected to the first table 121 and may rotate the first table 121. For example, the first table rotation driver 122a may allow the first table 121 to rotate about an Z-axis (see FIG. 1). The first aligning driver 122b may be connected to the first table 121 and may move the first table 121 in a direction (for example, along the Y-axis of FIG. 1). The first aligning driver 122b may move the first table 121 in a direction that is different from a general movement direction of the first stage 120 according to an operation of the first linear driver 172 (for example, along the X-axis of FIG. 1).

The first table rotation driver 122a may have various suitable forms. For example, the first table rotation driver 122a may be in the form of a step motor connected to a center (or a central portion) of the first table 121. In another embodiment, the first table rotation driver 122a may include a shaft arranged eccentrically from the center of the first table 121, and connected to the first table 121, and may also include a motor connected to the shaft. In another embodiment, the first table rotation driver 122a may include a cylinder connected to the first table 121 so as to be eccentric from the center of the first table 121. In another embodiment, the first table rotation driver 122a may include a gear unit connected to the first table 121 eccentrically from the center of the first table 121, and may include a motor connected to the gear unit. In some embodiments, the gear unit may include a spur gear and a rack gear. When the first table rotation driver 122a is arranged eccentrically from the center of the first table 121 and connected to the first table 121, the center of the first table 121 may be rotatably connected to the first aligning driver 122b. The first table rotation driver 122a is not limited thereto and may include any suitable apparatus and structure that may rotate the first table 121 by an angle (e.g., by as much as a certain angle or a predetermined angle). However, for convenience of description, an embodiment in which the first table rotation driver 122a includes a step motor to which the first table 121 is connected is primarily described below.

The first aligning driver 122b may have various suitable forms. For example, the first aligning driver 122b may be connected to the first table rotation driver 122a and may move the first table rotation driver 122a in a direction (e.g., in a predetermined direction). For example, the first aligning driver 122b may include a ball screw connected to the first table rotation driver 122a, and a motor connected to the ball screw. In another embodiment, the first aligning driver 122b may include a linear motor connected to the first table rotation driver 122a. In another embodiment, the first aligning driver 122b may include a gear unit connected to the first table rotation driver 122a, and a motor connected to the gear unit. In some embodiments, the gear unit may include a spur gear connected to the motor, and a rack gear connected to the spur gear and the first table rotation driver 122a. The first aligning driver 122b is not limited thereto, and may include any suitable apparatus and structure that is connected to the first table rotation driver 122a and linearly moves the first table 121. For convenience of description, an embodiment in which the first aligning driver 122b includes a linear motor is primarily described below.

A display panel P may be positioned on, and fixed to, the second stage 130. Also, the second stage 130 may be spaced apart from the first stage 120. In some embodiments, the second stage 130 and the first stage 120 may linearly move in (or along) one direction (e.g., in a length direction of the first support 111, or along the X-axis of FIG. 1). For example, the first stage 120 and the second stage 130 may each be positioned on the first support 111 and thus may each independently linearly move along the first support 111. The second stage 130 and the first support 111 may be connected by the second linear driver 173.

The second stage 130 may include a second table 131, and a second table alignment driver 132. The second table alignment driver 132 may include a second table rotation driver 132a and a second aligning driver 132b. The second table 131 and the second table alignment driver 132 may respectively be substantially the same as, or similar to, the first table 121 and the first table alignment driver 122 described above, respectively, and thus, additional descriptions thereof may be omitted.

The adhesive belt 140 may be fixed to the tension maintenance portion 150. In some embodiments, the film member F may be attached to the adhesive belt 140. The adhesive belt 140 may include a belt body 141 and an adhesive sheet 142. Materials of the belt body 141 and the adhesive sheet 142 may be different from each other. For example, the belt body 141 may include stainless steel (SUS), and the adhesive sheet 142 may include synthetic resin. The belt body 141 and the adhesive sheet 142 may be flexible.

The tension maintenance portion 150 may fix the adhesive belt 140 and may also apply force to the adhesive belt 140, thereby maintaining a tension of the adhesive belt 140. The tension maintenance portion 150 may include an ascent-descent portion 151, a movement portion 152, a tension portion 153, a tension maintenance roller 154, and a fixing portion 155.

The ascent-descent portion 151 may be connected to the second support 112, and may ascend and descend (e.g., may move up and down along the Z-axis in FIG. 1). As such, an ascent-descent driver 171 may be provided between the ascent-descent portion 151 and the second support 112 to allow the ascent-descent portion 151 to ascend and descend. The ascent-descent driver 171 may include a ball screw connected to the tension maintenance portion 150, and may include a motor connected to the ball screw. In another embodiment, the ascent-descent driver 171 may include a linear motor connected to the tension maintenance portion 150. In another embodiment, the ascent-descent driver 171 may include a gear unit connected to the tension maintenance portion 150, and a motor connected to the gear unit. For example, the gear unit may include a spur gear connected to the motor, and a rack gear connected to the spur gear and to the tension maintenance portion 150. The ascent-descent driver 171 is not limited thereto and may include any suitable apparatus and structure that is connected to the tension maintenance portion 150 and linearly moves the tension maintenance portion 150. For convenience of description, an embodiment in which the ascent-descent driver 171 includes a linear motor is primarily described below.

The movement portion 152 may be located (or installed) on the ascent-descent portion 151 to move linearly. A driver may be provided between the movement portion 152 and the ascent-descent portion 151 to allow the movement portion 152 to move linearly. The driver may be substantially the same as or similar to the first aligning driver 122b or the second aligning driver 132b described above, and thus, additional descriptions thereof may be omitted.

The tension portion 153 may be arranged on the ascent-descent portion 151. The tension portion 153 may maintain the tension of the adhesive belt 140 by applying a force to the adhesive belt 140. For example, the tension portion 153 may apply a tensile force to the adhesive belt 140.

The tension portion 153 may have various suitable forms. For example, the tension portion 153 may include a motor and a shaft that are connected to the motor, and that have a length that is variable according to an operation of the motor. In another embodiment, the tension portion 153 may include a second length-variable portion 153a, and a contact roller 153b connected to the second length-variable portion 153a. The second length-variable portion 153a may be substantially the same as, or similar to, a first length-variable portion 161 described below, and thus, additional descriptions of the second length-variable portion 153a may be omitted. For convenience of description, an embodiment in which the tension portion 153 includes the second length-variable portion 153a and the contact roller 153b are primarily described herein.

The second length-variable portion 153a may have an end that is fixed to the ascent-descent portion 151. The contact roller 153b may be arranged at an end (e.g., a lower end or a bottom end) of the second length-variable portion 153a, and a location of the contact roller 153b may vary according to an operation of the second length-variable portion 153a. Also, the contact roller 153b may bend the adhesive belt 140 (for example, may bend the adhesive belt 140 by as much as a certain angle or a predetermined angle), thereby maintaining the tension of the adhesive belt 140.

When a display apparatus is manufactured by sticking the film member F to the display panel P, the tension of the adhesive belt 140 may change. For example, the tension of the adhesive belt 140 may be degraded due to various external factors, such as external heat, a force applied by the pressing portion 160, etc., and may be degraded due to various internal factors, such as degradation of an elastic force. As such, the second length-variable portion 153a may be driven to allow the contact roller 153b to apply a force to the adhesive belt 140. Accordingly, as the force is applied to the adhesive belt 140, a tensile force is applied, and thus, the tension may return to the previous level.

The tension maintenance roller 154 may be rotatably installed on the ascent-descent portion 151. The tension maintenance roller 154 may be arranged to face the tension portion 153. Further, the tension maintenance roller 154 may be arranged to face the tension portion 153 and may maintain tension of the adhesive belt 140 by bending the adhesive belt 140.

The fixing portion 155 may be installed on the ascent-descent portion 151 to fix both ends of the adhesive belt 140. The fixing portion 155 may have various suitable forms. In an embodiment, the fixing portion 155 may be in the form of a clamp. In another embodiment, the fixing portion 155 may include a bolt, a pin, etc. connected to the ascent-descent portion 151. In another embodiment, an opening may be formed in the fixing portion 155 to insert the adhesive belt 140 into a separate member. For convenience of description, an embodiment in which an opening is formed in the fixing portion 155 to insert the adhesive belt 140 into a separate member is primarily described herein.

The pressing portion 160 may be connected to the tension maintenance portion 150 so as to move linearly. The pressing portion 160 may be connected to the movement portion 152 and may move in (or along) the length direction of the first support 111.

The pressing portion 160 may include the first length-variable portion 161, a pressure roller 162, and a bending roller 163. The first length-variable portion 161 may be connected to the pressure roller 162 and to the movement portion 152.

The first length-variable portion 161 may allow the pressure roller 162 to ascend and descend (e.g., may allow the pressure roller 162 to move up and down). The first length-variable portion 161 may include a cylinder.

The pressure roller 162 may be connected to the first length-variable portion 161, and thus, a height of the pressure roller 162 may change (or a distance between the pressure roller 162 and the first support 111 may change). In some embodiments, the tension of the adhesive belt 140 may vary according to the height of the pressure roller 162.

The bending roller 163 may be connected to the first length-variable portion 161. For example, the bending roller 163 may be connected to the pressure roller 162 by a bracket, a frame, or the like. In some embodiments, the bending roller 163 may ascend and descend (or linearly move) in accord with the pressure roller 162.

The pressure roller 162 and the bending roller 163 may bend the adhesive belt 140 in opposite directions. For example, the bending roller 163 may bend the adhesive belt 140 such that an angle between a portion of the adhesive belt 140, which is bent by the pressure roller 162 (e.g., that is bent by contacting the pressure roller 162), and an upper surface (or a first surface) of the display panel P is about 20 degrees or greater. When the angle between the portion of the adhesive belt 140 that is bent by the pressure roller 162 and the upper surface of the display panel P is less than about 20 degrees, it may be difficult to separate the film member F from the adhesive belt 140. Also, the bending roller 163 and the pressure roller 162 may contact different surfaces of the adhesive belt 140. For example, the pressure roller 162 may contact the belt body 141, and the bending roller 163 may contact the adhesive sheet 142. As such, an angle at which the adhesive belt 140 is bent by the pressure roller 162 may be, as described above, maintained to be about 20 degrees or greater. Also, a distance between the pressure roller 162 and the bending roller 163 may be maintained (e.g., constantly maintained), and thus, in a portion where adhesion of the film member F and the display panel P is performed, tension of the adhesive belt 140 may be maintained (e.g., constantly maintained).

The first stage 120 and the second stage 130 may be respectively connected to the first linear driver 172 and the second linear driver 173. In some embodiments, the first linear driver 172 and the second linear driver 173 may respectively be the same as, or similar to, the first aligning driver 122b or the second aligning driver 132b described above, and thus, additional descriptions thereof may be omitted. For convenience of description, an embodiment in which the first linear driver 172 and the second linear driver 173 each include a linear motor is primarily described herein. In some embodiments, the first linear driver 172 and the second linear driver 173 may use (or include) some elements in common.

The first linear driver 172 and the second linear driver 173 may respectively linearly move the first stage 120 and the second stage 130, and may also adjust (e.g., finely adjust) the first table 121 and the second table 131, respectively.

The vision portion 180 may be spaced from (e.g., spaced apart from) the support 110. The vision portion 180 may capture an image of the film member F of the first table 121 and/or may capture an image of the display panel P of the second table 131. The first table alignment driver 122 and the second table alignment driver 132 may by operated (or utilized) to align at least one of a location of the film member F and a location of the display panel P based on (or according to) the captured image.

Hereinafter, a method of manufacturing the display apparatus by utilizing the apparatus 100 is described.

Figure 2:
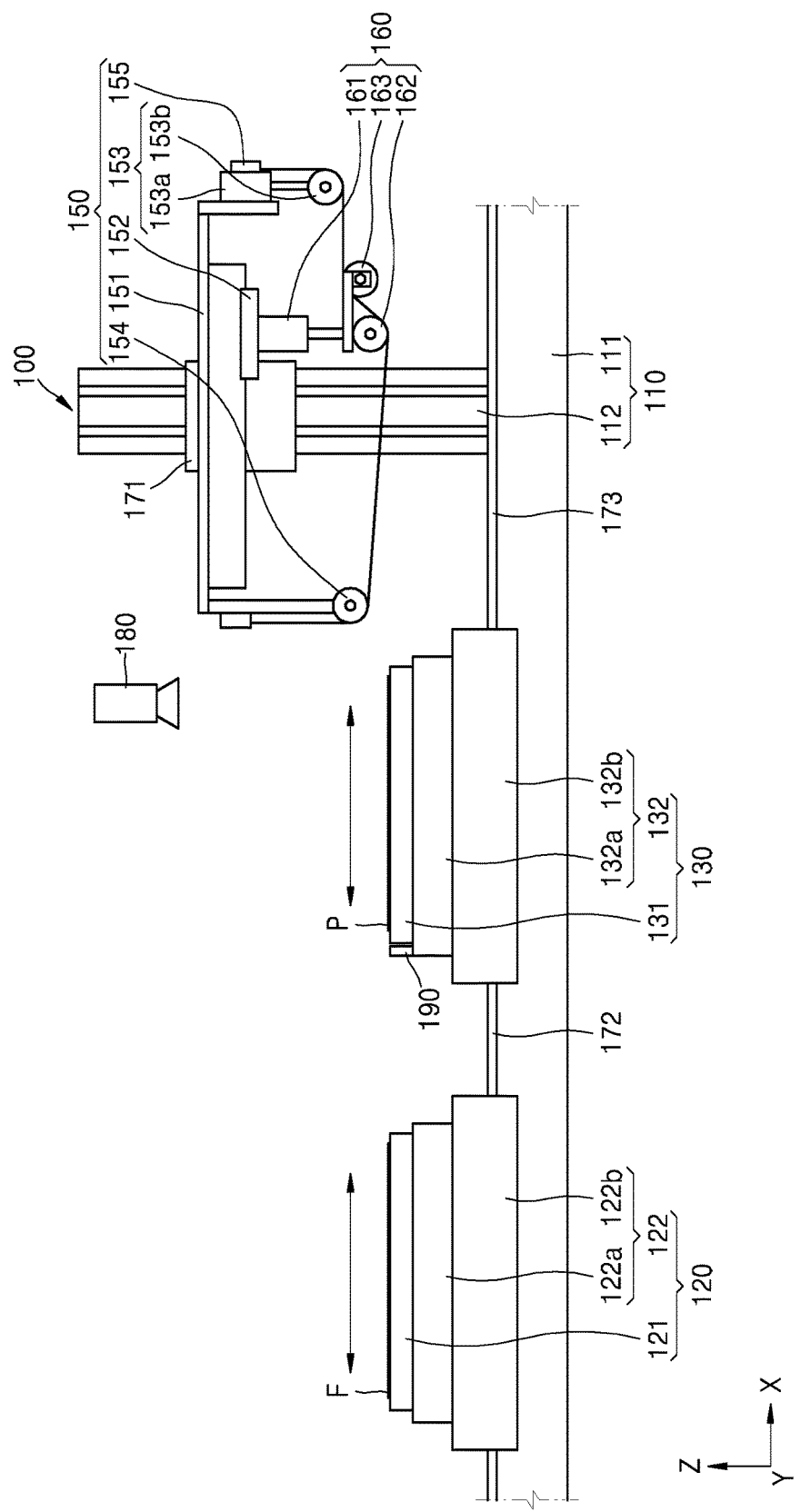
FIG. 2 is a front view of the apparatus for manufacturing a display apparatus of FIG. 1 according to a first operation.

FIG. 2 is a front view of the apparatus 100 for manufacturing a display apparatus of FIG. 1 according to a first operation.

Referring to FIG. 2, the film member F and the display panel P may be respectively positioned on the first table 121 and the second table 131. For example, the film member F and the display panel P may be respectively supplied (or applied) to the first table 121 and the second table 131 by a robot arm (e.g., by an external robot arm).

When the film member F, which may include a polarizing film, is positioned on the first table 121, and the display panel P is positioned on the second table 131, the first linear driver 172 and the second linear driver 173 may operate and place (or position) the first table 121 below the vision portion 180.

The vision portion 180 may capture an image of a first surface (e.g., an upper surface) of the first table 121. In some embodiments, an alignment mark may be formed on the upper surface of the first table 121, and the vision portion 180 may capture an image (or images) of the alignment mark of the first table 121 and the film member F. A separation distance of the film member F from the alignment mark may be calculated based on the captured image(s). In some embodiments, there may be two alignment marks. Further, a misalignment degree, for example, of the film member F may be calculated by calculating a distance between the two alignment marks and a side of the film member F (or one of the alignment marks of the film member F). Based on a calculated value, at least one of the first linear driver 172, the first table rotation driver 122a, and the first aligning driver 122b may be operated so that the film member F may be suitably arranged (e.g., may be arranged on or in a predetermined location).

The display panel P positioned on the second table 131 may then be aligned. For example, as in the alignment method of the film member F, images of an alignment mark of the second table 131 and the display panel P, which are the images captured by the vision portion 180, may be compared with each other to obtain information regarding a misalignment degree, a location, etc. of the display panel P.

Also, based on the obtained information, at least one of the second linear driver 173, the second table rotation driver 132a, and the second aligning driver 132b may be operated.

As described above, when alignment of the film member F and the display panel P is completed by adjusting the first table 121 and the second table 131, the first table 121 and the second table 131 may be moved (or carried) to an initial location.

Figure 3:
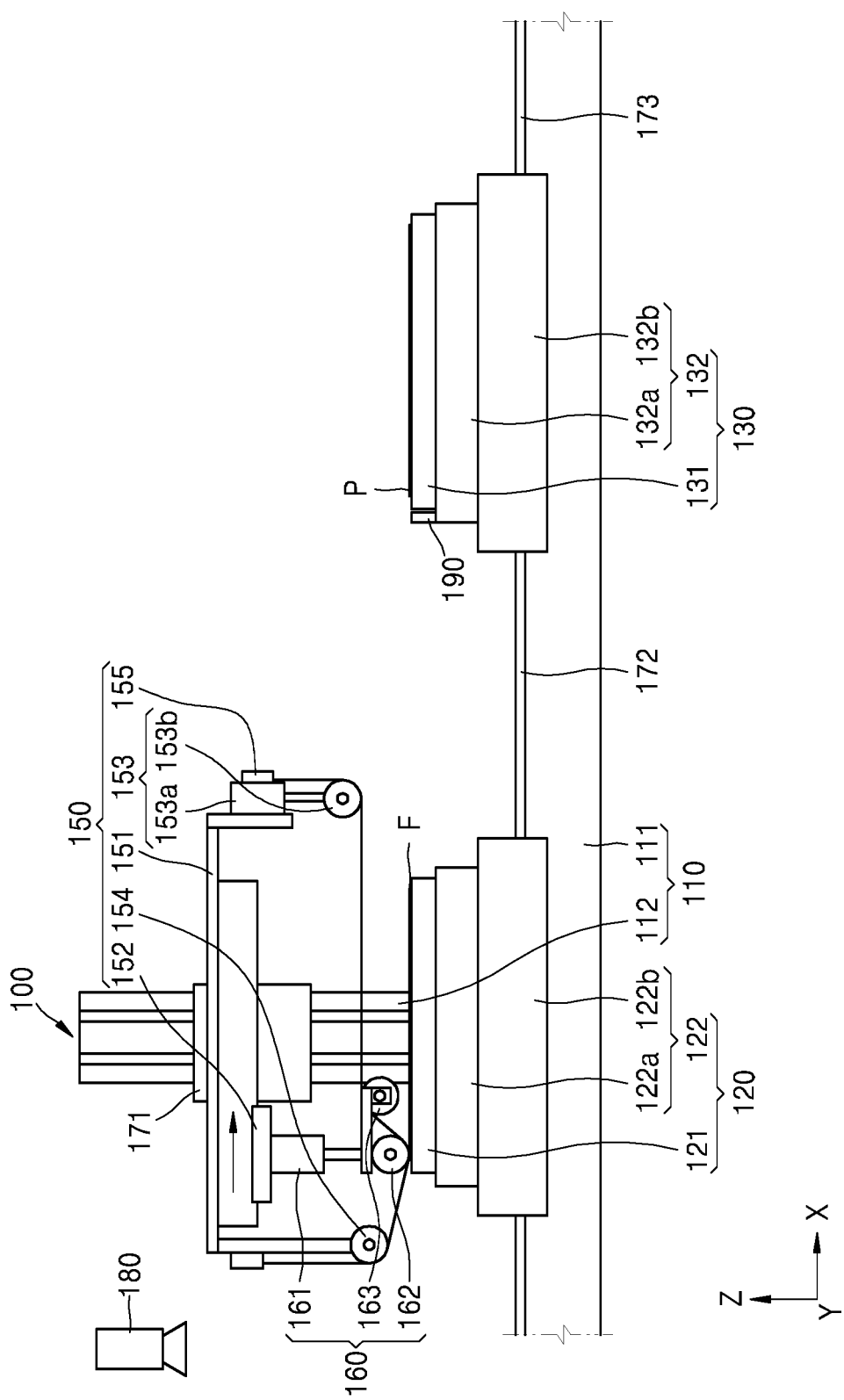
FIG. 3 is a front view of the apparatus for manufacturing a display apparatus of FIG. 1 according to a second operation.
Figure 4:
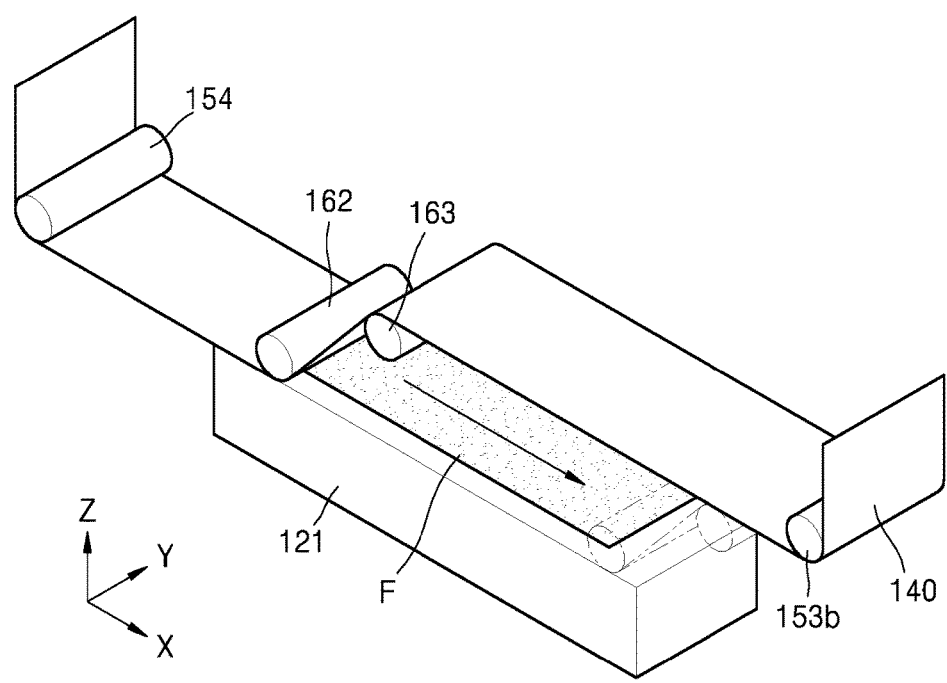
FIG. 4 is a perspective view of an adhesive belt, a pressure roller, and a bending roller of the apparatus of FIG. 3.

FIG. 3 is a front view of the apparatus 100 for manufacturing a display apparatus of FIG. 1 according to a second operation. FIG. 4 is a perspective view of operations of the adhesive belt 140, the pressure roller 162, and the bending roller 163 of FIG. 3.

Referring to FIGS. 3 and 4, the film member F that has been aligned may be attached to the adhesive belt 140. For example, the first linear driver 172 may linearly move the first table alignment driver 122 and the first table 121 in a direction (e.g., a certain direction or a predetermined direction) and may place (or position) the first table 121 below the adhesive belt 140.

Afterwards, the ascent-descent driver 171 may operate, and may allow the tension maintenance portion 150 to descend at the second support 112. In some embodiments, the tension maintenance portion 150 may descend (e.g., may descend to a predetermined location). For example, the second table 131 may include a location sensor 190, and the location sensor 190 may sense a location of the tension maintenance portion 150. The location sensor 190 may include any suitable apparatus, such as a laser sensor, a light-receiving sensor, etc., that measures a location or a distance of an object.

When the tension maintenance portion 150 is positioned (e.g., positioned at the predetermined location), the film member F may be attached to the adhesive belt 140 as the pressing portion 160 is moved by moving the movement portion 152. For example, the first length-variable portion 161 may be operated, and thus, the pressure roller 162 may apply force to the adhesive belt 140. Also, the movement portion 152 may move linearly (e.g., may move linearly in the first direction X). When the movement portion 152 moves linearly (e.g., in the first direction X), the first length-variable portion 161 may move the pressure roller 162 to the adhesive belt 140. The pressure roller 162 may press the adhesive belt 140 against the film member F, and the film member F may be attached to the adhesive belt 140. Also, the bending roller 163 may move linearly with the pressure roller 162. For example, an end (e.g., a first end) of the film member F may first start to contact the adhesive belt 140, and the film member F may gradually adhere to the adhesive belt 140 in a direction from the first end of the film member F to a second end of the film member F opposite to the first end.

After the film member F adheres to the adhesive belt 140 as described above, the first linear driver 172 may operate and move the first table 121 to its original place (or initial position). The ascent-descent driver 171 may allow the tension maintenance portion 150 to ascend (e.g., to ascend by a certain amount or a predetermined amount) and thus may separate the first table 121 and the film member F from each other.

Figure 5:
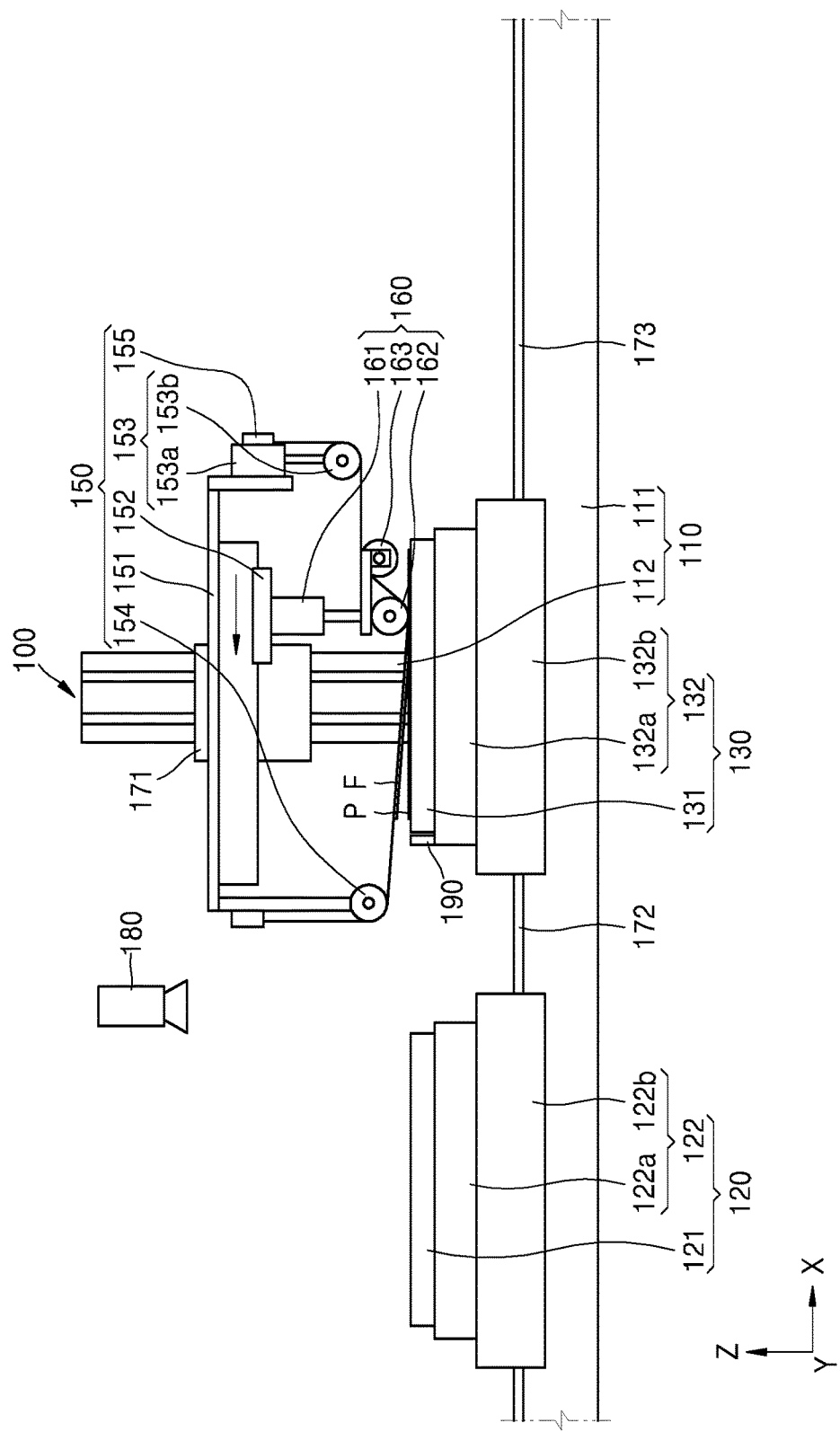
FIG. 5 is a front view of the apparatus for manufacturing a display apparatus of FIG. 1 according to a third operation.
Figure 6:
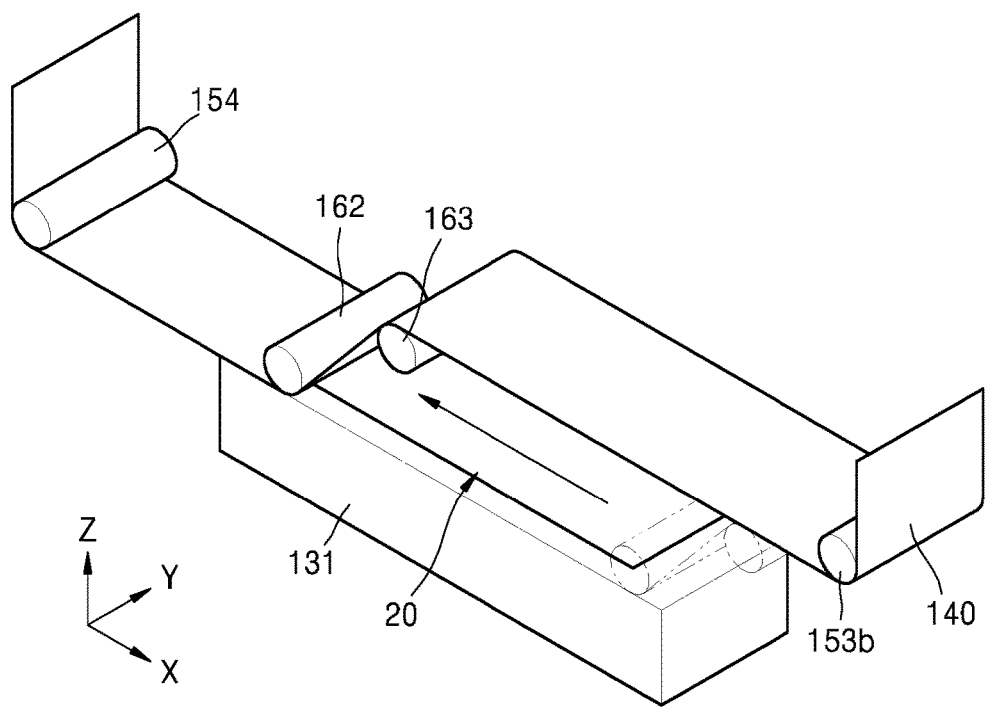
FIG. 6 is a perspective view of an adhesive belt, a pressure roller, and a bending roller of the apparatus for manufacturing a display apparatus of FIG. 5.

FIG. 5 is a front view of the apparatus 100 for manufacturing a display apparatus of FIG. 1 according to a third operation. FIG. 6 is a perspective view of operations of the adhesive belt 140, the pressure roller 162, and the bending roller 163 of FIG. 5.

Referring to FIGS. 5 and 6, after the film member F is attached to the adhesive belt 140, the second linear driver 173 may be operated, and may place (or position) the second stage 130 below the film member F. The display panel P may be arranged to correspond to a lower surface of the film member F.

When the above process is completed, the ascent-descent driver 171 may operate to allow the tension maintenance portion 150 to descend. The film member F may contact the display panel P. A portion of the film member F may first contact an end of the display panel P. Also, an adhesive member may be arranged between the film member F and the display panel P. The adhesive member may have been coated on, or attached to, at least one surface of the film member F and the display panel P.

The movement portion 152 may move linearly (e.g., may move linearly in the first direction X). For example, a linear movement direction of the movement portion 152 may be the opposite of a direction in which the movement portion 152 moves to attach the film member F to the adhesive belt 140.

While the movement portion 152 moves, the first length-variable portion 161 may continuously press the pressure roller 162 toward the display panel P. Also, while the movement portion 152 moves, the bending roller 163 may move, along with the pressure roller 162, in the same direction as the pressure roller 162.

Adhesion of the film member F and the display panel P as described above may be performed in a direction from the second end of the film member F to the first end of the film member F. For example, a movement direction of the movement portion 152 while attaching the film member F to the adhesive belt 140, and a movement direction of the movement portion 152 while attaching the film member F to the display panel P, may be opposite to each other.

When the above process is completed, the display apparatus having the film member F adhering to the display panel P may be arranged on the second table 131. Also, while the film member F and the display panel P are attached to each other as described above, a new film member F may be positioned on the first table 121.

When manufacturing the display apparatus is completed, the ascent-descent driver 171 may operate to allow the tension maintenance portion 150 to ascend. Also, the second linear driver 173 may operate to allow the second stage 130 to return to its initial position. When the second stage 130 returns to its initial position, a new display panel P may be positioned on the second table 131.

The operations as described above may be performed a plurality of times to manufacture a plurality of display apparatuses.

As such, according to the apparatus 100 and method of manufacturing a display apparatus according to one or more embodiments of the present invention, the film member F may uniformly (or substantially uniformly) adhere to the display panel P. Also, according to the apparatus 100 and method of manufacturing a display apparatus according to one or more embodiments of the present invention, the film member F may be rapidly attached onto the display panel P.

According to the apparatus 100 and method of manufacturing a display apparatus according to one or more embodiments of the present invention, a defect rate in manufacturing the display apparatus may be decreased (or reduced) by gradually attaching the film member F and the display panel P to each other in a direction from the first end to the second end.

Figure 7:
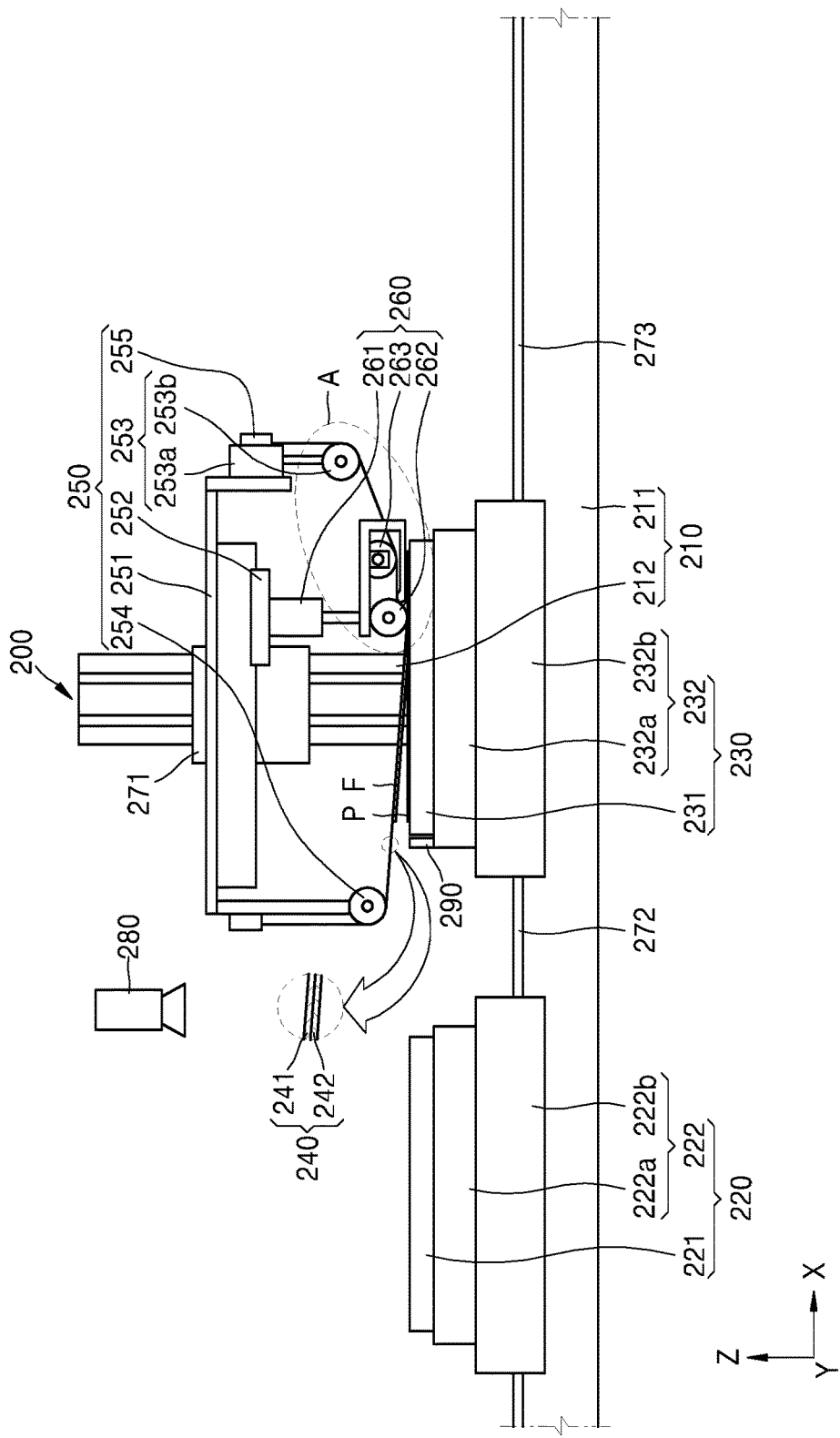
FIG. 7 is a front view of an apparatus for manufacturing a display apparatus according to another embodiment.
Figure 8:
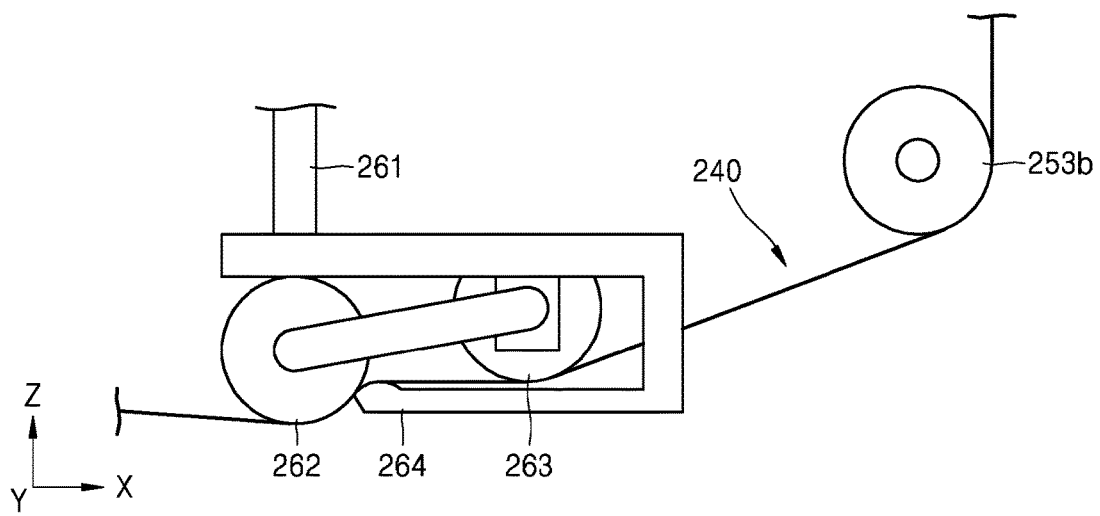
FIG. 8 is an enlarged view of the portion A of the apparatus for manufacturing a display apparatus of FIG. 7.

FIG. 7 is a front view of an apparatus 200 for manufacturing a display apparatus, according to another embodiment. FIG. 8 is an enlarged view of the portion A of FIG. 7.

Referring to FIGS. 7 and 8, the apparatus 200 may include a support 210, a first stage 220, a second stage 230, an adhesive belt 240, a tension maintenance portion 250, a pressing portion 260, a first linear driver 272, a second linear driver 273, and a vision portion 280. The support 210, the first stage 220, the second stage 230, the adhesive belt 240, the tension maintenance portion 250, the first linear driver 272, the second linear driver 273, and the vision portion 280 may respectively be the same as, or similar to, the support 110, the first stage 120, the second stage 130, the adhesive belt 140, the tension maintenance portion 150, the first linear driver 172, the second linear driver 173, and the vision portion 180 described above, and thus, detailed descriptions thereof may be omitted.

The pressing portion 260 may include a first length-variable portion 261, a pressure roller 262, a bending roller 263, and a contacting portion 264. The first length-variable portion 261 and the pressure roller 262 are the same as or similar to the first length-variable portion 161 and the pressure roller 162 described above, and thus, detailed descriptions thereof may be omitted.

The bending roller 263 may be spaced apart from the pressure roller 262. For example, the bending roller 263 may contact and bend the adhesive belt 240. Also, the bending roller 263 may contact a same surface of the adhesive belt 240 that the pressure roller 262 contacts. A center of the bending roller 263 may be arranged at a location different from that of a center of the pressure roller 262. For example, the center of the bending roller 263 may be arranged higher above the ground (in the third direction Z) than the center of the pressure roller 262.

The contacting portion 264 may be connected to the first length-variable portion 261. The contacting portion 264 may move with the pressure roller 262. The contacting portion 264 may face a surface of the adhesive belt 240 that the pressure roller 262 does not contact.

The contacting portion 264 may be arranged to have a bent end. The contacting portion 264 may be arranged to contact the adhesive belt 240. For example, a bent part of the contacting portion 264 may press the adhesive belt 240 against the pressure roller 262. A part of the contacting portion 264 that contacts the adhesive belt 240 may be higher than a lowermost portion of the pressure roller 262.

Regarding an operation of the apparatus 200, the film member F and the display panel P may be respectively positioned on a first table 221 and a second table 231. The first linear driver 272 and the second linear driver 273 may operate to respectively move the first stage 220 and the second stage 230.

After the first stage 220 and the second stage 230 move, the vision portion 280 may sequentially capture images of the film member F and the first table 221 and the display panel P and the second table 231.

Based on a result of image capturing, a first table rotation driver 222a and a first aligning driver 222b of a first table alignment driver 222 may be operated to align the film member F. Also, based on the result of image capturing, a second table rotation driver 232a and a second aligning driver 232b of a second table alignment driver 232 may be operated to align the display panel P.

When the above process is completed, the first stage 220 and the second stage 230 may be returned to their respective initial locations, and then the first linear driver 272 may operate and place the first stage 220 below the adhesive belt 240. An ascent-descent driver 271 may operate and position the tension maintenance portion 250 (e.g., may position the tension maintenance portion 250 to be at a predetermined location).

Afterwards, as the movement portion 252 moves in a direction (e.g., the first direction X), the first length-variable portion 261 may operate, and thus the pressure roller 262 may press a belt body 241 toward the film member F. The film member F may be separated from the first table 221 and attached to an adhesive sheet 242 sequentially in a direction from a first end of the film member F to a second end of the film member F opposite to the first end.

The ascent-descent driver 271 may operate and allow the tension maintenance portion 250 to ascend, and the first linear driver 272 may operate and return the first stage 220 to its initial location.

When the film member F is attached to the adhesive belt 240, the second linear driver 273 may operate and place (or position) the second stage 230 below the film member F. Afterwards, the ascent-descent driver 271 may operate and allow the tension maintenance portion 250 to descend.

Also, the movement portion 252 may move in the opposite direction compared to when the film member F is attached to the adhesive belt 240. For example, a second length-variable portion 253a may operate, and thus, a contact roller 253b may continuously apply force to the adhesive belt 240.

As described above, when the second length-variable portion 253a operates as the movement portion 252 moves, the contacting portion 264 and the pressure roller 262 may separate the film member F from the adhesive belt 240. For example, when a cylinder presses the adhesive belt 240 with the pressure roller 262, the adhesive belt 240 may be bent by the pressure roller 262 and the contacting portion 264. The film member F may become easy to separate from the adhesive belt 240. Also, a bottom end of the contacting portion 264 may be arranged on a bottom end of the film member F. When the movement portion 252 moves, the bottom end of the contacting portion 264 may be inserted into a gap between the adhesive belt 240 and the film member F. Accordingly, the film member F may be separated from the adhesive belt 240 and attached onto the display panel P.

When the above operation (or process) is completed, the ascent-descent driver 271 may operate and allow the tension maintenance portion 250 to ascend, and the second linear driver 273 may return the second stage 230, on which a display apparatus is seated (or placed), to its initial location. After returning to its initial location, the display apparatus on the second stage 230 may be removed (or carried to the outside).

As such, according to the apparatus 200 and method of manufacturing a display apparatus according to one or more embodiments of the present invention, the film member F may uniformly (or substantially uniformly) adhere to the display panel P. Also, according to the apparatus 200 and method of manufacturing a display apparatus, the film member F may be rapidly attached onto the display panel P.

According to the apparatus 200 and method of manufacturing a display apparatus according to one or more embodiments of the present invention, a defect rate in manufacturing the display apparatus may be decreased (or reduced) by attaching the film member F and the display panel P to each other sequentially in a direction from the first end to the second end.

Figure 9:
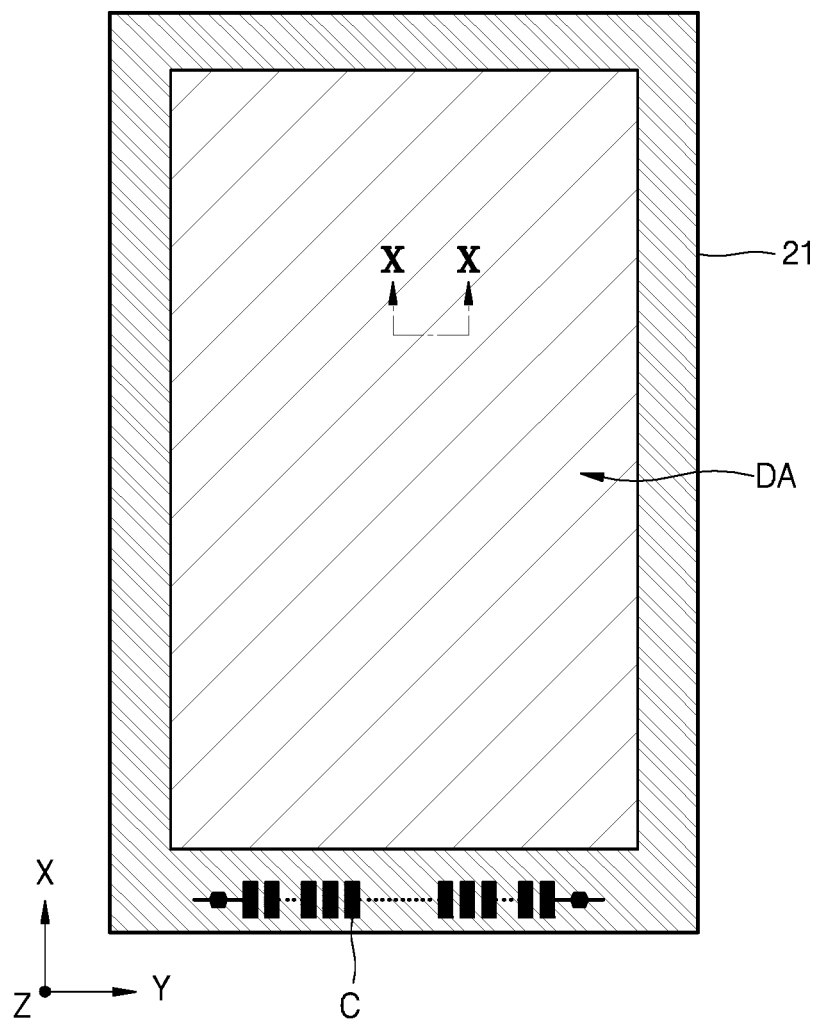
FIG. 9 is a plan view of a display apparatus manufactured by the apparatus for manufacturing a display apparatus of FIG. 1.
Figure 10:
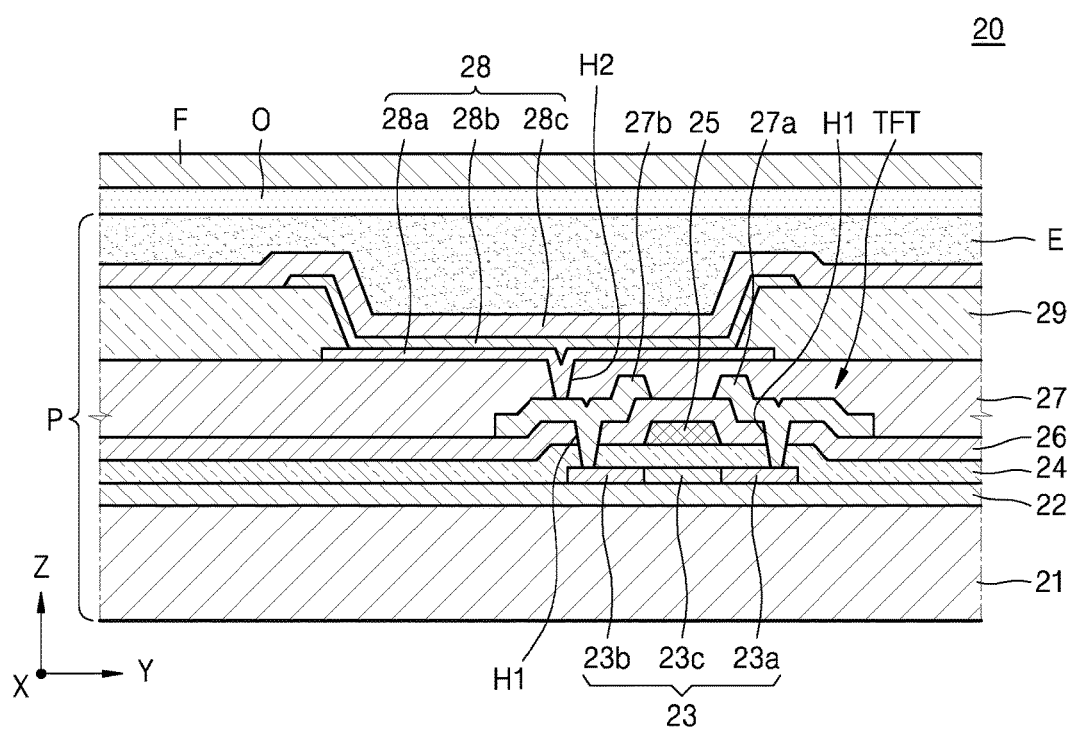
FIG. 10 is a cross-sectional view of the display apparatus of FIG. 9 taken along the line X-X of FIG. 9.

FIG. 9 is a plan view of a display apparatus 20 manufactured by the manufacturing apparatus 100 illustrated in FIG. 1. FIG. 10 is a cross-sectional view of the display apparatus 20, taken along the line X-X of FIG. 9.

Referring to FIGS. 9 and 10, in the display apparatus 20, a display area DA may be defined on a substrate 21, and a non-display area may be defined at an outer portion of the display area DA. A display unit is arranged on the display area DA, and a power line, etc. may be arranged on (or in) the non-display area. In addition, a pad portion C may be arranged on (or in) the non-display area.

The display apparatus 20 may include the display panel P and the film member F. The display panel P may include the substrate 21, the display unit, and a thin film encapsulation layer E.

Various layers may be arranged on the substrate 21. The substrate 21 may include a plastic material and/or a metal material such as SUS and/or Ti. In addition, the substrate 21 may include polyimide (PI). For convenience of description, an embodiment in which the substrate 21 includes PI is primarily described herein.

The display unit may be formed on the substrate 21. For example, the display unit may include a thin film transistor TFT, a passivation layer 27 covering the thin film transistor TFT, and an organic light-emitting diode (OLED) 28 on the passivation layer 27.

A buffer layer 22 including an organic compound and/or an inorganic compound is further formed on the substrate 21, for example, the buffer layer 22 may include $SiO_x$ ($x \geq 1$) or $SiN_x$ ($x \geq 1$).

An active layer 23 is formed on the buffer layer 22 (e.g., is formed in a predetermined pattern), and the active layer 23 is buried (or covered) by a gate insulating layer 24. The active layer 23 includes a source region 23a, a drain region 23b, and a channel region 23c between the source region 23a and the drain region 23b.

The active layer 23 may include various materials. For example, the active layer 23 may include an inorganic semiconductor material such as amorphous silicon and/or crystalline silicon. As another example, the active layer 23 may include an oxide semiconductor. As another example, the active layer 23 may include an organic semiconductor material. Hereinafter, for convenience of description, an embodiment in which the active layer 23 includes amorphous silicon is primarily described.

The active layer 23 may be obtained by forming an amorphous silicon layer on the buffer layer 22, crystallizing the amorphous silicon layer to a polycrystalline silicon layer, and patterning the polycrystalline silicon layer. The source region 23a and the drain region 23b of the active layer 23 are doped with impurities, according to a kind of the thin film transistor (TFT), e.g., a driving TFT, or a switching TFT.

A gate electrode 25 corresponding to the active layer 23 and an interlayer insulating layer 26 burying (or covering) the gate electrode 25 are formed on the gate insulating layer 24.

In addition, after forming contact holes (or contact openings) H1 in the interlayer insulating layer 26 and in the gate insulating layer 24, a source electrode 27a and a drain electrode 27b are formed on the interlayer insulating layer 26 to respectively contact the source region 23a and the drain region 23b.

The passivation layer 27 is formed on the thin film transistor TFT, and a pixel electrode 28a of the OLED 28 is formed on the passivation layer 27. The pixel electrode 28a contacts the drain electrode 27b of the thin film transistor TFT through a via hole (or via opening) H2 formed in the passivation layer 27. The passivation layer 27 may be formed to have a single-layered structure or multi-layered structure including an inorganic material and/or an organic material. The passivation layer 27 may be formed as a planarization layer to provide a flat (or substantially flat) upper surface without regard to irregular lower layers, but may be formed according to a shape of the lower layers. In addition, the passivation layer 27 may include a transparent insulating material to provide (or achieve) a resonant effect.

After forming the pixel electrode 27a on the passivation layer 27, a pixel defining layer 29 including an organic material and/or an inorganic material is formed to cover the pixel electrode 28a and the passivation layer 27. The pixel defining layer 29 has (or defines) an opening to expose the pixel electrode 28a (e.g., to expose a portion of the pixel electrode 28a).

In addition, an intermediate layer 28b and an opposite electrode 28c are formed at least on the pixel electrode 28a.

The pixel electrode 28a may function as an anode electrode and the opposite electrode 28c may function as a cathode electrode, or vice versa.

The pixel electrode 28a and the opposite electrode 28c are insulated from each other via the intermediate layer 28b, and apply voltages of different polarities to the intermediate layer 28b so that an organic emission layer emits light.

The intermediate layer 28b includes the organic emission layer. In some embodiments, the intermediate layer 28b includes the organic emission layer and may further include at least one of a hole injection layer, a hole transport layer, an electron transport layer, and an electron injection layer. However, embodiments of the present invention are not limited thereto, and the intermediate layer 28b may include an organic emission layer and may further include other various functional layers.

A unit pixel includes a plurality of sub-pixels that may emit lights of various colors. For example, the sub-pixels may include sub-pixels that emit lights of red, green, and blue or sub-pixels (not shown) that emit lights of red, green, blue, and white.

The thin film encapsulation layer E may include a plurality of inorganic layers, or may include an inorganic layer and an organic layer.

The organic layer of the thin film encapsulation layer E includes a polymer, and may be a single layer or a layer stack including any one or more of polyethylene terephthalate, polyimide, polycarbonate, epoxy, polyethylene, and polyacrylate. The organic layer may include polyacrylate, and may include a polymerized monomer composition including a diacrylate-based monomer and/or a triacrylate-based monomer. The monomer composition may further include a monoacrylate-based monomer. Also, the monomer composition may further include any suitable photoinitiator, such as trimethyl benzoyl diphenyl phosphine oxide (TPO), but embodiments of the present invention are not limited thereto.

The inorganic layer of the thin film encapsulation layer E may be a single layer or a layer stack including a metal oxide and/or a metal nitride. For example, the inorganic layer may include any one of $SiNx$, $Al_2O_3$, $SiO_2$, and $TiO_2$.

A top layer of the thin film encapsulation layer E that is exposed to the outside may include an inorganic layer, which may prevent intrusion of moisture into the OLED 28.

The thin film encapsulation layer E may include at least one sandwich structure in which at least one organic layer is inserted between at least two inorganic layers. In some embodiments, the thin film encapsulation layer E may include at least one sandwich structure in which at least one inorganic layer is inserted between at least two organic layers. In some embodiments, the thin film encapsulation layer E may include a sandwich structure in which at least one organic layer is inserted between at least two inorganic layers and a sandwich structure in which at least one inorganic layer is inserted between at least two organic layers.

The thin film encapsulation layer E may include a first inorganic layer, a first organic layer, and a second inorganic layer sequentially formed from a top portion of the OLED 28.

In some embodiments, the thin film encapsulation layer E may include a first inorganic layer, a first organic layer, a second inorganic layer, a second organic layer, and a third inorganic layer sequentially formed from the top portion of the OLED 28.

In some embodiments, the thin film encapsulation layer E may include a first inorganic layer, a first organic layer, a second inorganic layer, a second organic layer, a third inorganic layer, a third organic layer, and a fourth inorganic layer from the top of the OLED 28.

A halogenized metal layer including LiF may be further included between the OLED 28 and the first inorganic layer. The halogenized metal layer may prevent the OLED 28 from being damaged when the first inorganic layer is formed by a sputtering method.

An area of the first organic layer may be less than that of the second inorganic layer, and an area of the second organic layer may be less than that of the third inorganic layer.

In addition, the display panel P may also include a touch layer, in which a signal is generated according to contact by a user. For example, the touch layer may be formed on the thin film encapsulation layer E. However, for convenience of description, an embodiment in which the display panel P does not include the touch layer is primarily described herein.

The film member F may have various suitable forms. For example, the film member F may include at least one of a polarizing film, a touchscreen panel, and/or various functional films. For example, the functional film may be a film member having a function (e.g., a certain function or a predetermined function), such as a scratch-resistant film member, a corrosion-resistant film member, a reinforcing film member, etc.

The film member F may be flexible. An adhesive member O may be arranged between the film member F and the display panel P. The adhesive member O may be of a liquid type, a gel type, or a film type, for example.

In an apparatus and method of manufacturing a display apparatus according to one or more embodiments of the present invention, the display apparatus may be rapidly and simply manufactured.

In an apparatus and method of manufacturing a display apparatus according to one or more embodiments of the present invention, a defect that may arise in the manufacture of the display apparatus may be decreased (or likelihood thereof may be reduced), and a film member may be accurately attached onto a display panel.

In an apparatus and method of manufacturing a display apparatus according to one or more embodiments of the present invention, a film member and a display panel may uniformly adhere to each other.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims and their equivalents.

What is claimed is:

1. An apparatus for manufacturing a display apparatus, the apparatus comprising:
   a support;
   a first stage arranged on the support, the first stage being configured to move linearly and to receive a film member thereon;
   a second stage spaced apart from the first stage, and arranged on the support, the second stage being configured to move linearly and to receive a display panel thereon;
   an adhesive belt spaced from the support, the adhesive belt being configured to selectively adhere to the film member;
   a tension maintenance portion arranged on the support, the tension maintenance portion being configured to ascend and descend and to maintain a tension of the adhesive belt; and
   a pressing portion under the tension maintenance portion, the pressing portion being configured to move linearly and to press the adhesive belt toward one of the first stage and the second stage.

2. The apparatus of claim 1, wherein the support comprises:
   a first support, the first stage and the second stage being configured to move linearly along the first support; and
   a second support connected to the first support, the tension maintenance portion being configured to move linearly along the second support.

3. The apparatus of claim 1, further comprising a first linear driver between the first stage and the support, wherein the first linear driver allows the first stage to reciprocate in a first direction.

4. The apparatus of claim 1, further comprising a second linear driver between the second stage and the support, wherein the second linear driver allows the second stage to reciprocate in a first direction.

5. The apparatus of claim 1, wherein the first stage comprises:
   a first table for receiving the film member; and
   a first table alignment driver configured to rotate the first table or to move the first table in a second direction.

6. The apparatus of claim 1, wherein the second stage comprises:
   a second table for receiving the display panel; and
   a second table alignment driver configured to rotate the second table or to move the second table in a second direction.

7. The apparatus of claim 1, wherein the adhesive belt comprises:
   a belt body fixed to the tension maintenance portion; and
   an adhesive sheet arranged on the belt body.

8. The apparatus of claim 1,
   wherein the tension maintenance portion comprises:
   an ascent-descent portion mounted on the support and configured to ascend and descend along a third direction; and
   a movement portion connected to the ascent-descent portion and configured to move in a direction different from the third direction.

9. The apparatus of claim 8, wherein the tension maintenance portion further comprises a tension portion arranged on the ascent-descent portion and configured to maintain tension of the adhesive belt.

10. The apparatus of claim 8, wherein the pressing portion comprises:
    a first length-variable portion arranged at the movement portion and having a variable length; and
    a pressure roller connected to the first length-variable portion and contacting the adhesive belt.

11. The apparatus of claim 10, wherein the pressing portion further comprises a bending roller connected to the first length-variable portion and configured to bend the adhesive belt.

12. The apparatus of claim 11, wherein the bending roller and the pressure roller contact different surfaces of the adhesive belt.

13. The apparatus of claim 10, wherein the pressing portion further comprises a contacting portion connected to the pressure roller and configured to separate the film member from the adhesive belt when the film member and the adhesive belt are attached to each other.

* * * * *